(12) United States Patent
Mishra et al.

(10) Patent No.: US 9,979,782 B2
(45) Date of Patent: May 22, 2018

(54) LOW-POWER AND LOW-LATENCY DEVICE ENUMERATION WITH CARTESIAN ADDRESSING

(71) Applicant: QUALCOMM Incorporated, San Diego, CA (US)

(72) Inventors: Lalan Jee Mishra, San Diego, CA (US); James Panian, San Marcos, CA (US); Richard Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 15/077,841

(22) Filed: Mar. 22, 2016

(65) Prior Publication Data

US 2016/0285968 A1  Sep. 29, 2016

Related U.S. Application Data

(60) Provisional application No. 62/137,687, filed on Mar. 24, 2015, provisional application No. 62/208,312, filed on Aug. 21, 2015.

(51) Int. Cl.
*H04L 29/08* (2006.01)
*H04L 29/12* (2006.01)
*G06F 13/42* (2006.01)

(52) U.S. Cl.
CPC ...... *H04L 67/1091* (2013.01); *G06F 13/4247* (2013.01); *H04L 61/2007* (2013.01); *H04L 61/604* (2013.01); *G06F 2213/0052* (2013.01)

(58) Field of Classification Search
CPC ..... H04L 67/00–67/42; H04L 61/20–61/6072; G06F 13/4204–13/4295; G06F 2213/0052
See application file for complete search history.

(56) References Cited

U.S. PATENT DOCUMENTS

| | | | |
|---|---|---|---|
| 6,363,077 B1 | 3/2002 | Wong et al. |
| 6,363,520 B1 | 3/2002 | Boubezari et al. |
| 7,245,623 B1 | 7/2007 | Cheriton |
| 7,278,034 B2 | 10/2007 | Shipton |
| 9,111,013 B2 | 8/2015 | Cheriton |
| 2005/0216631 A1 | 9/2005 | Daly et al. |

FOREIGN PATENT DOCUMENTS

WO  WO-2011053295 A1  5/2011

OTHER PUBLICATIONS

International Search Report and Written Opinion—PCT/US2016/023826—ISA/EPO—dated Jun. 23, 2016.

*Primary Examiner* — Clayton R Williams
(74) *Attorney, Agent, or Firm* — Haynes & Boone, LLP

(57) ABSTRACT

An enumeration technique is provided that requires no pre-assignment of addresses to slave devices connected through P2P links to a host device. With regard to any P2P link between devices, one device has a master interface and the remaining device has a slave interface. To distinguish between the master and slave interfaces, a master/slave status bit may be used. Each P2P link has a link ID that may be concatenated with the status bit for a corresponding interface (slave or master) to form a node ID. The host device receives a unique concatenated address from each slave device that represents a concatenation of the node ID for the slave and the node ID for any intervening interfaces between the slave device and the host device. The host device then assigns a unique Cartesian address to each slave device.

11 Claims, 6 Drawing Sheets

LOW-POWER AND LOW-LATENCY DEVICE ENUMERATION WITH CARTESIAN ADDRESSING

CROSS REFERENCE TO RELATED APPLICATIONS

This application claims the benefit of U.S. Provisional Application No. 62/137,687, filed Mar. 24, 2015. In addition, this application claims the benefit of U.S. Provisional Application No. 62/208,312, filed Aug. 21, 2015.

TECHNICAL FIELD

This application relates to integrated circuits, and more particularly to the enumeration of integrated circuits.

BACKGROUND

A number of digital signaling protocols have been developed to support communication between integrated circuits in a system such as a mobile device. Examples of such digital signaling protocols include general purpose input/output (GPIO) and universal asynchronous receiver transmitter (UART). As technology advances, these various digital signaling protocols have been enhanced. For example, the assignee of the present matter has developed a "virtual" GPIO architecture in which a GPIO finite state machine serializes GPIO data received from a processor through a GPIO interface and transmits the serialized GPIO data over a dedicated transmit pin. Since the processor needs no software modification in that it may continue to interface with the GPIO interface in a conventional fashion as it would to transmit GPIO date over conventional GPIO pins, the virtualizing of the GPIO data is transparent to the processor. The processor thus needs no software or hardware modifications with regard to communication through the virtual GPIO interface. A remote integrated circuit receives the serialized virtual GPIO data over a dedicated receive pin. In addition, each virtual GPIO integrated circuit may include a clock pin to synchronize the VGPIO transmission and reception. In other embodiments, no clock pin is utilized such that there are both two-pin and three-pin virtual GPIO embodiments.

Since there are different digital signaling protocol configurations, it is desirable for a host processor or device in a system to identify the particular configuration being used by the remaining devices in a system during a process denoted as device enumeration. However, existing device enumeration techniques are problematic. For example, one conventional approach to device enumeration involves the burning of fuses or similar one-time-programmable memories in the various devices within a system. Upon power-up, the system's host device reads the fuse states in the various remaining devices to obtain their enumeration data. Such fuse-based enumeration, however, suffers from the die area demands for the fuses. As an alternative, I/O bootstrapping enumeration involves the tying of dedicated pins to either power or ground to program the enumeration data. I/O bootstrapping thus increases packaging costs and requires additional components on the circuit board. Finally, firmware has been used for enumeration but this also increases die demands and complexity.

Accordingly, there is a need in the art for improved enumeration techniques.

SUMMARY

An enumeration technique is provided that requires no pre-assignment of addresses to slave devices connected through point-to-point (P2P) links to a host device. With regard to any P2P link between devices, one device has a master interface and the remaining device has a slave interface. To distinguish between the master and slave interfaces, a master/slave status bit may be used. Each P2P link has a link ID that may be concatenated with the status bit for a corresponding interface (slave or master) to form a node ID. Each master interface and slave interface may be deemed to comprise a "node" having the corresponding node ID that is a concatenation of the master/slave status for the node and the link ID for the P2P link coupled to the node. The host device receives a unique concatenated address from each node in the slave devices that represents a concatenation of the node ID for the node and the node ID for any intervening nodes between the node and the host device. This unique concatenated address is designated in the following discussion as a "host-facing node ID."

Each P2P link couples between a corresponding slave interface and a master interface. The host-facing node ID for each node is guaranteed to be unique because the P2P links that couple to the master interfaces of a device (host or slave) having more than one master interface are unique. In that regard, each P2P link may have a default link ID that is unchanged if the master interface coupled to the P2P link is the only master interface in the device including the master interface coupled to the P2P link. A device including more than one master interface includes a state machine designated herein as a "node aggregator" that is configured to assign a unique link ID to each P2P link coupled to one of the multiple master interfaces. For example, if a device includes two or more master interfaces, the node aggregator may leave one of the master interface's P2P link with its default link ID but change the remaining master interface's P2P links to each have a unique changed link ID such that each link ID for the device's master interfaces' P2P links are unique. This uniqueness then guarantees that the host-facing node IDs for each node will in turn be unique.

Given the unique host-facing node IDs, the host device then assigns a bit-optimized address such as a unique Cartesian address to each slave device, wherein each Cartesian address comprises an X address and a Y address. Routing through the resulting network of slave devices may be performed using the Cartesian addresses without the complication of routing tables.

BRIEF DESCRIPTION OF THE DRAWINGS

FIG. 3 illustrates an example network of slave devices and a host device in which each slave device is assigned a unique Cartesian address in accordance with an aspect of the disclosure.

Embodiments of the disclosure and their advantages are best understood by referring to the detailed description that follows. It should be appreciated that like reference numerals are used to identify like elements illustrated in one or more of the figures.

DETAILED DESCRIPTION

Figure 1A:
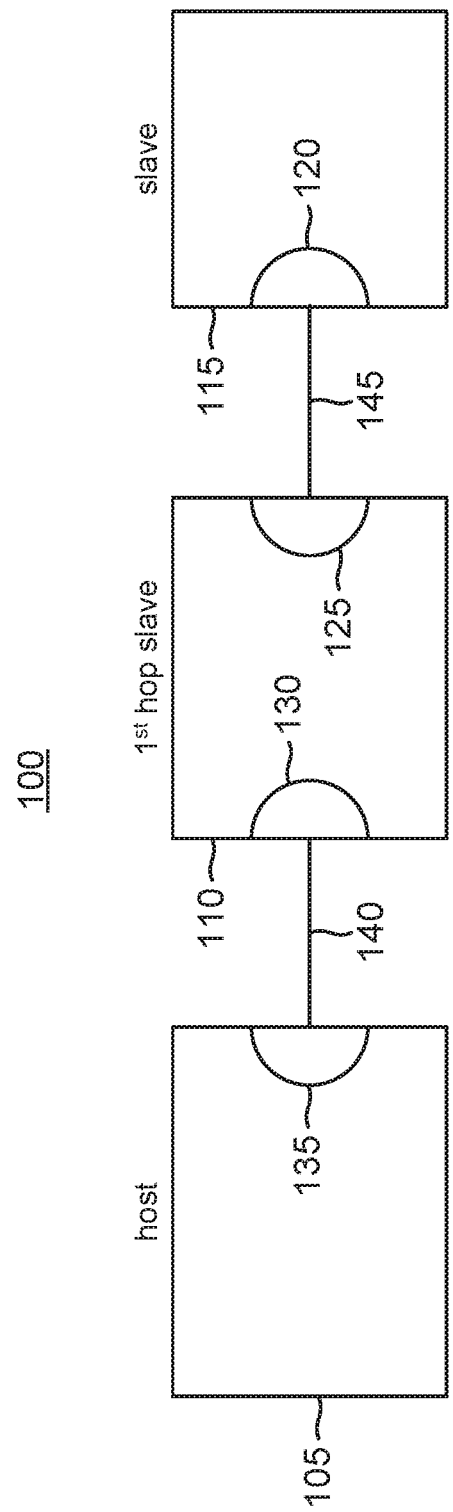
FIG. 1A is block diagram of an example P2P system in which no device has more than one master interface in accordance with an aspect of the disclosure.

Enumeration systems and methods are provided that eliminate the need for pre-assigning an address to any given device. The complexity and die area demands of conventional enumeration techniques such as the use of fuses, I/O bootstrapping, or firmware are thus advantageously reduced or eliminated. To provide these advantageous properties, a host device includes one or more point-to-point (P2P) interfaces for communicating with a plurality of slave devices. Although there is only one host device, the slave devices themselves may be sub-hosts with respect to other slave devices over corresponding P2P interfaces. Within the resulting system, the direct physical connection (the P2P connection) between any two nodes is not shared with any other node. Since the P2P connection between such nodes is thus unique, no pre-assignment of addresses is required.

The enumeration of the slave devices by the host device occurs over two stages. In a first enumeration stage, the host obtain the "raw addresses" of the slave devices. As will be explained further herein, a raw address represents a concatenation of a device's status (slave or master) and a link ID. Note that a slave device may link through another slave device to the host device or integrated circuit (as used herein, "device" and "integrated circuit" are used interchangeably). For example, a first slave device may link through a second slave device to the host device. With regard to the first slave device, the second slave device is a master device, which simply means that the second slave device is a "host-facing" device with respect to the P2P link between the first and second slave devices. The host device itself is of course the ultimate "host-facing" device as it is always the master device on its P2P links with the associated slave devices.

With regard to the P2P links from a master device to its slaves, each link has a unique ID. The default ID for each P2P link may be given some binary value such as zero. Upon the initiation of enumeration, the host device determines how many P2P links it has. One of its P2P links will retain its default ID whereas the remaining links are given their own unique binary ID by the host device. A "Cartesian" addressing technique will be discussed further herein that is particularly advantageous because no routing tables are then required in the slave devices. As suggested by the designation of "Cartesian," each resulting assigned address is actually a pair of addresses. A first one of the addresses in each pair is deemed to be the "X" coordinate whereas a remaining address in each pair is deemed to be the "Y" coordinate. Each Cartesian address is thus formed by an (X,Y) pair of addresses. The first address in the pair may be deemed to be the equivalent of the x coordinate in a Cartesian coordinate system whereas the second address in the pair may be deemed to be the equivalent of the y coordinate in a Cartesian coordinate system However, a single address may be assigned to each slave device in alternative embodiments such as through the assignment of successive binary values although will be appreciated that non-consecutive numbering schemes may be used so long as each P2P link to the host is assigned a unique link ID. To distinguish those slave devices having a direct P2P link with the host device as compared to those slave devices that must link to the host device through other slave devices, the slave devices having the direct P2P link with the host device are denoted as "first-hop" slave devices. Responsive to an enumeration initiation, the host device signals to each first-hop slave device what the link ID will be for the P2P link between the first hop slave device and the host device.

Slaves devices that must couple through another slave device to communicate with the host device are by definition not first-hop slave devices. A slave device that intervenes between an non-first-hop slave device and the host device acts as a master device with regard to the non-first-hop slave device. Such "master" slave devices may have more than one slave device having a direct P2P link to the master slave device. A master slave device will then be triggered by the initiation of the enumeration to communicate to each slave device having a P2P link to the master slave device the corresponding link ID for the P2P link. With respect to any given slave device (regardless of whether it acts as a master device to another slave device), there is only one master device with which it has a P2P link. Each slave device has a slave interface through which it interfaces with its master device over the corresponding P2P link. With the link IDs all assigned, each slave device may then report to its master device a "node ID" for its slave interface that is a concatenation of its status as a slave and the link ID for the P2P link between the slave device and the master device. For example, a slave status may be represented by a binary zero that is then concatenated with the link ID to form the node ID.

Each master slave device has an interface for each P2P link through which it directly couples to other slave devices. This interface may be denoted as a master interface since it serves another slave device. Such a master interface may be given a node ID that is a concatenation of the corresponding link ID and its status as a master. For example, a master status may be represented by a binary one that is then concatenated with the link ID to form the node ID for the master interface. In turn, the master slave device has a slave interface for the P2P link through which it communicates with its master device. For example, the master device to a first-hop slave device would be the host device itself. So the interface in the first-hop slave device for the P2P link to the host device is a slave interface and is given a slave status accordingly.

The resulting formation of the various node IDs may be better appreciated with regard to an example system 100 shown in FIG. 1A. A host device 105 includes a master interface 135 for a P2P link 140 to a slave interface 130 in a first-hop slave device 110. A slave device 115 couples through its slave interface 120 to a P2P link 145 that in turn couples to a master interface 125 in first-hop slave device 110. First-hop slave device 110 is thus a master slave device to slave device 115. System 100 is an example network in which no device has more than one master interface. Networks in which a device may have two or more master interfaces are discussed further below. P2P links 140 and 145 may thus be represented by their default link ID such as a binary zero (or some other suitable binary value). In embodiments in which a device includes two or more master interfaces, the corresponding P2P links would need to be assigned unique link IDs as discussed earlier. Regardless of the number of master interfaces in each device, each link ID may comprise a multi-bit word. The following discussion will assume that the link ID is represented by a 7-bit link ID word such that no device could include more than 128 different master interfaces. However, it will be appreciated that the width of the link ID may be expanded (or contracted) in alternative embodiments. An advantage of using a relatively-wide link ID such as a 7-bit-wide link ID is that the propagation of errors in the resulting assignment of raw addresses is reduced as compared to embodiments having, for example, a three-bit wide link ID that could support only eight unique master interfaces per device.

Given this 7-bit width for the link IDs, the assignment of the node IDs for each interface 135, 130, 125, and 120 may occur as follows. The default link ID for each of P2P links 140 and 145 is [0 00 00 00]. The one-bit status as slave or master for each interface is concatenated with this link ID to form the resulting node ID. A slave status is represented by a 0 bit whereas a master status is represented by a 1 bit. For example, the node IDs for both slave interfaces 130 and 120 is [00 00 00 00]. In contrast, the host-facing node IDs for master interfaces 135 and 125 is [10 00 00 00]. Given this assignment of node IDs for each interface (slave or master), a "host-facing node ID" is determined for each interface. The host-facing node ID is the concatenation of each node ID from a given slave device to host device 105. For example, the host-facing node ID for first-hop slave device 110 is [00 00 00 00 10 00 00 00]. In contrast the host-facing node ID for slave device 115 is [00 00 00 00 10 00 00 00 00 00 00 10 00 00 00]. The formation of host-facing node IDs for each slave device is quite advantageous because the host-facing node IDs are guaranteed to be unique despite there being no pre-existing assignment of IDs to the devices such as through the use of fuses or boot-strapping I/O. Thus, system 100 is much more compact and less expensive as compared to conventional enumeration systems.

Figure 1B:
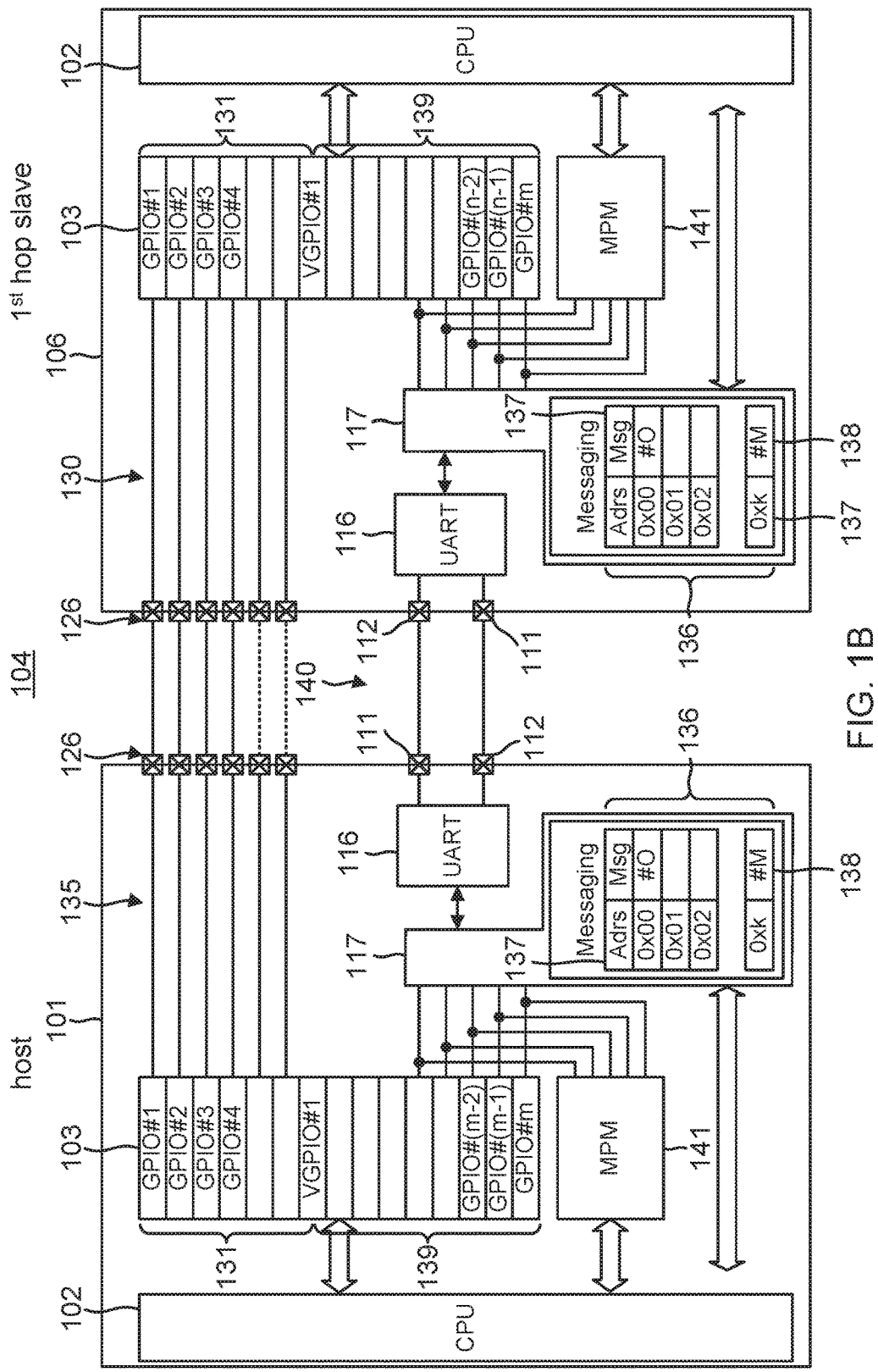
FIG. 1B is a circuit diagram for a the master interface in a host device and a corresponding slave interface in a slave device in accordance with an aspect of the disclosure.

Each master interface and slave interface may comprise a virtual GPIO (VGI) interface such as shown in FIG. 1B for a hybrid virtual GPIO system 104 that includes a host integrated circuit (IC) 101 and a slave IC 106. The following discussion will thus be directed to a virtual GPIO (VGI) implementation in which each P2P link is a VGI link. But it will be appreciated that the principles and techniques disclosed herein are widely applicable to any suitable P2P link. Integrated circuits 101 and 106 each includes a GPIO interface 103, a hybrid virtual GPIO FSM 117, and a UART interface 116. The UART interface 116 in host IC 101 is configured to drive a transmit pin 111 that couples over a transmission line such as a circuit board trace to a receive pin 112 for the UART interface 116 in slave IC 106. Similarly, a transmit pin 111 for the UART interface 116 in slave IC 106 couples to a receive pin 112 for the UART interface 116 in application processor IC 100. As used herein, "pin" is a generic term to cover the structure such as a pad or an actual pin that an integrated circuit uses to couple to leads on circuit board or other suitable transmission lines.

Each hybrid virtual GPIO FSM 117 monitors the GPIO state changes discussed below. At a power-on reset (POR) for the corresponding integrated circuit, each UART interface 116 may be configured to use the same baud rate and same settings for the virtual GPIO frame length and messaging signal frame length. Each UART interface 116 may also be software configured by the corresponding integrated circuit's processor (CPU) 102 as indicated by the CPU link to each UART interface 116.

Each processor 102 is configured to transmit and receive GPIO signals through a corresponding GPIO interface 103. In particular, each processor 102 may present a transmit set of GPIO signals to the corresponding GPIO interface 103 for transmission to the remote processor. Similarly, each processor 102 may receive a receive set of GPIO signals from the corresponding GPIO interface 103 as transmitted from the remote processor. With regard to the transmit set of GPIO signals, a first portion of the GPIO signals may be transmitted and received on conventional GPIO pins 126 as GPIO signals 131. For illustration clarity, only four GPIO signals 131 are labeled in FIG. 1B for each virtual GPIO interface 103, ranging from a GPIO signal #1 to a GPIO signal #4. The actual number of GPIO signals 131 may be greater or smaller than four. A remaining portion of the transmit set of GPIO signals presented from the corresponding processor 102 to each GPIO interface 103 is not transmitted or received through conventional GPIO pins 126. Instead, each GPIO interface 103 provides the remaining portion as a plurality of virtual GPIO signals 139 to the corresponding hybrid virtual GPIO FSM 117 so that they may be serialized and transmitted to the receiving one of the integrated circuits 101 and 106 in one or more frames of virtual GPIO signals. In system 104, the set of virtual GPIO signals 139 ranges from a first virtual GPIO signal (#1) to an mth virtual GPIO signal (#m). The value of the positive integer m may vary depending upon the needs of a given implementation.

In addition, each processor 102 may write a transmit set of messaging signals to a set of messaging registers 136 in the corresponding hybrid virtual GPIO FSM 117. Each messaging register 136 corresponds to a particular address 137 for a corresponding message signal 138. In system 104, each hybrid virtual GPIO FSM 117 is shown having a plurality of (M+1) messaging registers ranging from a zero register 136 to an Mth register 136. The value of the positive integer M may vary depending upon the needs of a given implementation. Each hybrid virtual GPIO FSM 117 presents its transmit set of messaging signals and the transmit set of virtual GPIO signals to the corresponding UART interface 116 that is explained further below. Note that virtual GPIO signals 139 do not each have their own dedicated pins as is the case for conventional GPIO signals 130. This is quite advantageous in that hybrid virtual GPIO system 104 achieves a significant reduction of pins for integrated circuits 101 and 106 as compared to a conventional GPIO embodiment in which virtual GPIO signals 139 would each require their own GPIO pin.

Since virtual GPIO signals 139 and messaging signals 138 are transmitted and received through a finite state machine such as hybrid virtual GPIO FSM 117, processor 102 may be asleep or in another type of dormant state yet still be able to receive virtual GPIO signals 139 and messaging signals 136. In this fashion, hybrid virtual GPIO system 104 not only advantageously economizes the number of pins for each GPIO interface 103 but is also low power. With regard to each processor 102, there is no difference between GPIO signals 130 and virtual GPIO signals 139: they are both treated as GPIO signals that are transmitted and received as necessary through GPIO interface 103.

A processor 102 may need to receive an interrupt signal in response to changes in selected ones of virtual GPIO signals 139. For example, a modem power manager (MPM) 140 may monitor the state of selected virtual GPIO signals 139 such as programmed through interrupt configuration registers (not illustrated). Each virtual GPIO signal 139 may have a corresponding interrupt configuration register. Should a virtual GPIO signal 139 be required to generate an interrupt in response to that signal changing state, the corresponding configuration register would be programmed accordingly. Similarly, should a virtual GPIO signal 139 be one that does not generate an interrupt regardless of whether that signal has changed state, the corresponding interrupt configuration register would also be programmed accordingly. MPM 141 may also comprise a finite state machine. Thus, just like hybrid virtual GPIO FSM 117, MPM 141 is low power and is active regardless of whether its processor 102 is in a sleep mode or some other dormant state.

Virtual GPIO signals 139 may be subdivided into a transmit set and a receive set. Similarly, messaging signals 136 may be subdivided into a transmit set and a receive set. In a symmetric system, each set would have the same number. However, it will be appreciated that hybrid virtual GPIO system 104 is advantageous in that it can readily accommodate an asymmetric signaling embodiment in which the transmit and receive sets of virtual GPIO signals 139 and messaging signals 136 have different sizes. Regardless of whether system 104 is symmetric or asymmetric, each hybrid virtual GPIO FSM 117 receives the transmit set of virtual GPIO signals 139 in parallel from GPIO interface 103 in that each signal in the transmit sets is carried on its own lead (not illustrated) between GPIO interface 103 and the corresponding hybrid virtual GPIO FSM 117. In contrast, the resulting transmission of the transmit sets by hybrid virtual GPIO FSM 117 takes place over a single transmit pin 111

Comparing network 100 to hybrid virtual GPIO system 104, it may be seen that master interface 135 in host IC 101 is formed by hybrid virtual GPIO FSM 117 and UART 116 as well as MPM 141. The collection of hybrid virtual GPIO FSM 117, UART 116, and MPM 141 form an implementation of a VGI interface. Similarly, slave interface 130 in slave IC 106 is formed by the same components. Each hybrid virtual GPIO FSM 117 may be configured to practice the enumeration techniques discussed herein. The leads between pins 111 and 112 form a P2P link 140 between host IC 101 and slave IC 106.

Figure 2:
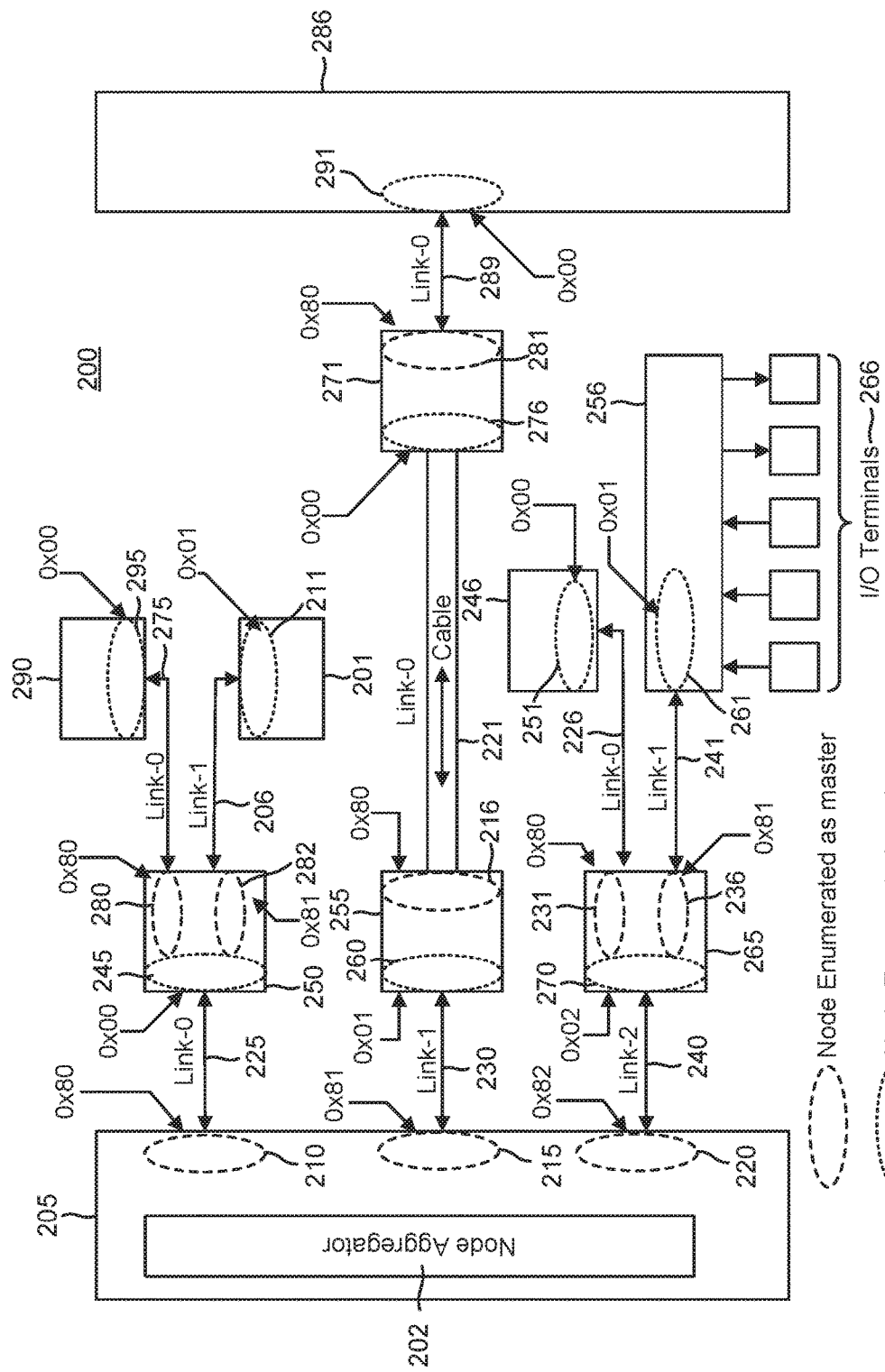
FIG. 2 is a block diagram of an example P2P system in which both the host device and some slave devices include more than one master interface in accordance with an aspect of the disclosure.

Another example system 200 is shown in FIG. 2. System 200 is more complex than system 100 or system 104 in that, for example, a host device 205 includes three master interfaces 210, 215, and 220 for corresponding P2P links 225, 230, and 240 with first-hop slave devices 250, 255, and 265, respectively. Host device 205 includes a node aggregator 202 that may comprise a finite state machine such as discussed with regard to hybrid virtual GPIO FSMs 117. Node aggregator 202 is configured to, upon power-up of system 200 (or some other suitable event that triggers an enumeration), determine the number of master interfaces within host device 205. Given this counting of the master interfaces, node aggregator 202 may then assign a unique link ID for the P2P link corresponding to each master interface in host device 205. A first P2P link such as P2P link 225 may retain its default link ID of [00 00 00 0]. This default link ID is designated as Link-0. Each remaining P2P link for host device 205 such as P2P links 230 and 240 is then assigned a new and unique link ID such as through counting from binary zero. P2P link 230 is thus assigned a link ID of [00 00 00 1] designated as Link-1 whereas P2P link 240 may be assigned a link ID of [00 00 01 0] designated as Link-2. It is this unique link ID for each P2P link to host device 205 that guarantees that the resulting host-facing node IDs for all the slave devices will be unique despite the lack of any pre-existing ID assignment such as through the use of fuses or I/O boot-strapping. Node aggregator 202 then identifies the changed unique link IDs to first-hop slave devices 255 and 265. Since slave device 250 then does not receive a changed link ID from host aggregator 202, it may assume that the default link ID of [00 00 00 0] for link-0 is valid.

Each interface in each device may be designated as a "node" regardless of whether the interface is a master interface or a slave interface. First-hop slave devices 250, 255, and 265 thus have two node IDs: one for their slave interface, and another for their master interface. In system 200, first-hop slave 250 includes a slave interface 245 for P2P link 225. The node ID for slave interface 245 is thus the concatenation of its slave status such as represented by a zero bit [0] with the link ID link-0 [00 00 00 0] for P2P link 225. The node ID for slave interface 245 is thus [00 00 00 00]. First-hop slave 250 serves as a master slave device for a slave device 290 and a slave device 201 through P2P links 275 and 206, respectively. First-hop slave 250 includes a master interface 280 for P2P link 275 and a master interface 282 for P2P link 206. Since there are two master interfaces in first-hop slave 250, it will include a node aggregator (not illustrated) such as node aggregator 202 discussed with regard to host device 205 for assigning a link-0 ID to P2P 275 and a link-1 ID to P2P link 206. The node ID for master interface 282 is thus the concatenation of its status as master such as represented by a one bit [1] with the link ID link-1 of [00 00 00 1]. The node ID for master interface 282 is thus [00 00 00 11]. Similarly, the node ID for master interface 280 is [00 00 00 01]. Note that it doesn't matter what order the concatenation is formed in so long as it is consistent for all the nodes.

On their face, the link IDs (Link-0 and Link-1) for P2P links 275 and 206 are identical to the ones used for P2P links 225 and 230, respectively. But that does not matter since the resulting node IDs will still be unique in system 200. Slave device 290 includes a slave interface 295 for P2P link 275. Similarly, slave device 201 includes a slave interface 211 for P2P link 206.

The final host-facing ID for a given node is thus the concatenation of the node ID for the given node with the node IDs of all intervening nodes between the given node and the host device. For example, the host-facing ID for slave interface 295 is the concatenation of its node ID with the node ID for master interface 280, slave interface 245,1 and master interface 210. For brevity, the node ID for each master or slave interface in FIG. 2 is shown using hexadecimal formal. The node ID for slave interface 295 is thus represented as 0X00. The host-facing ID for slave interface 295 is thus the concatenation of 0X00 with 0X80 (the node ID for master interface 28) and with 0X00 (the node ID for slave interface 245) and with 0X80 (the node ID for master interface 280).

Note that first-hop slave 265 is analogous to first-hop slave 250 in that first-hop slave 265 includes two master interfaces 231 and 236 for corresponding P2P links 226 and 241, respectively. First-hop slave 265 also includes a slave interface 270 for P2P link 240 to host device 205. Since first-hop slave 265 couples to two additional slave devices, first-hop slave 265 would thus also include a node aggregator (not illustrated) such as discussed with regard to node aggregator 202 for assigning a link-0 ID to P2P link 226 and for assigning a link-1 ID to P2P link 241. P2P link 226 couples to a slave interface 251 in a slave device 246. Similarly, P2P link 241 couples to a slave interface 261 in a slave device 256. The link ID assignment for P2P link 226 is thus communicated to slave interface 251 from first-hop device 265. Similarly, the link ID assignment for P2P link 241 is communicated to slave interface 261.

P2P links 226 and 241 have the same link IDs as used for P2P links 275 and 206 coupled to first-hop slave 250. But this overlap of link IDs does not matter as the resulting assignment of host-facing IDs to the various nodes is guaranteed to be unique because of the different link IDs assigned to P2P links 225 and 240. Slaves 246 and 290 are both "end point" slave devices in that these slave devices do not act as a master device to additional downstream slaves. The node ID for first-hop master interfaces 280 and 231 and also for a first-hop master interface 216 in first-hop slave device 255 is each 0x80 whereas the node ID for first-hop master interfaces 282 and 236 is 0x81. The concatenation of the node ID for slave interface 295 with the node ID for master interface 280 and also the concatenation of the node ID for slave interface 251 with the node ID for master interface 231 will thus both be 0x00, 0x80. Similarly the concatenation of the node ID for slave interface 211 with the node ID for master interface 282 and also the concatenation of the node ID for slave interface 261 with the node ID for master interface 236 will both be 0x01, 0x81.

But such identical partial concatenation results become unique upon further concatenation. For example, note that first-hop slave device 250 couples to host device 205 over a Link-0 ID whereas first-hop slave device 265 couples through a Link-2 ID to host device 205. Despite the partial concatenations being the same, the final host-facing node IDs for slave interfaces 295 and 251 will thus be different. Specifically, the host-facing node ID for slave interface 295 in end-point slave device 290 is 0x00, 0x80, 0x00, 0x80. In contrast, the host-facing node ID for slave interface 251 in end-point slave device 246 is 0x00, 0x80, 0x02, 0x82. Similarly, the host-facing node ID for slave interface 211 in slave device 201 is 0X01, 0X81, 0X00, 0X80 whereas the host-facing node ID for slave interface 261 in slave device 256 is 0X01, 0X81, 0X02, 0X82. In this fashion, all the nodes (whether the node is a master interface or a slave interface) end up with unique host-facing node IDs. Note that slave device 256 interfaces with a plurality of I/O terminals 266.

First-hop slave device 255 couples through first-hop master interface 216 over a P2P link 221 to a slave interface 276 having a node ID 0X00 in a master slave device 271. In turn master slave device 271 includes a master interface 281 having a node ID 0X80 couples though a P2P link 289 to a slave interface 291 having a node ID 0X00 in an end-point slave device 286. The physical topology of a given P2P link may vary. For example, each P2P link may comprise either a 2-wire or a 3-wire virtual GPIO link. Alternatively, a P2P link may comprise a cable such as illustrated for P2P link 221.

Although the resulting host-facing node IDs are all unique, note that they are relatively long and will thus involve some latency with regard to signaling involving such relatively lengthy addresses. Node aggregator 202 in host device 205 (or some other suitable state machine) may thus re-assign a bit-optimized address to each slave device. The host-facing node IDs may thus also be designated as "intermediate" addresses in that they may be replaced with corresponding bit-optimized addresses. Referring again to system 200, there are nine separate slave devices that will have a corresponding intermediate address determined through the concatenation process discussed above. Since there are nine such intermediate addresses, the various slave devices may instead be identified using at least a four-bit-wide (or greater) bit-optimized address. The resulting bit-optimized address assignment is quite advantageous in that no pre-determined addresses are required such that no fuses of I/O boot-strapping is necessary. In addition, the bit-optimized address assignment results in low-latency signaling between host device 205 and its slave devices.

After each node (master interface or slave interface) in the slave devices is assigned a host-facing node ID, node aggregator 202 in the host device may then proceed to address the nodes using their host-facing node IDs so that a more bit-optimized address may be assigned to each node. Processor 102 in host IC 101 of FIG. 1B may be programmed to function as node aggregator 202. Alternatively, node aggregator 202 may comprise a dedicated state machine. With regard to routing a message through the nodes in the slaves to a addressed-one of the nodes, node aggregator 202 sends a message including the host-facing node ID for the addressed node. This message would be transmitted from host device 205 through its master interface (e.g., one of master interfaces 210, 215, 220) that eventually couples through intervening nodes to the addressed node. For example, if host device 205 is addressing slave interface 291, the corresponding message is transmitted through master interface 215. The host-facing node ID for slave interface 291 is 0X00, 0X80, 0X00, 0X80, 0X01, 0X81. This host-facing node ID may be attached as a header to the message intended for slave interface 291. Each intervening node including master interface 215 is configured to delete its node ID from the received host-facing node ID to form a partial host-facing node ID that is then transmitted to the next downstream node. For example, master interface deletes its node ID of 0X81 from the host-facing node ID to form a first partial node-facing ID that remains as the header (or in some other pre-defined location) for the message transmitted to slave interface 260 in first-hop slave 255. The header received by slave interface 260 is thus 0X00, 0X80, 0X00, 0X80, 0X01. Slave interface 260 deletes its node ID from the header to form a second partial node-facing ID of 0X00, 0X80, 0X00, 0X80 that is transmitted as a new header with the message to master interface 216 in first-hop slave 255. Master interface 216 then deletes its node ID from the header to form a third partial node-facing ID of 0X00, 0X80, 0X00 that is transmitted as a new header with the message to slave interface 276 in second-hop slave device 271. Slave interface 276 deletes its node ID from the header to a form a fourth partial node-facing ID of 0X00, 0X80 that is transmitted as a new header with the message to master interface 281 in second-hop slave device 271. Master interface 278 then deletes its node ID from the header to form a new header of just 0X00, which is the node ID for the addressed node (slave interface 291). Master interface 278 then transmits the message with the header of 0X00 to slave interface 291. Slave interface 291 can then examiner the received header to detect that it is just a single node ID that matches its own node ID. Slave interface 291 can thus determine that the corresponding message is intended for slave interface 291 so that the appropriate action may be taken. For example, the message may be a command for slave interface 291 to replace its node ID with the bit-optimized address from node aggregator 202. In addition, the message may include rules such as a routing table for the routing of the bit-optimized addresses through the slave nodes.

The assignment of node IDs in network 100 of FIG. 1A is performed analogously as discussed with regard to FIG. 2. Since each device in network 100 couples through no more than one P2P link to downstream devices, P2P links 140 and 145 may retain their default link ID such as [00 00 00 0]. It will be appreciated that link IDs with fewer than 7 bits (or more than 7 bits) may be used in alternative embodiments.

In that regard, a one-bit default link ID such as [0] may be used in network 100. Given such a one-bit default link ID, slave interface 120 in end-point slave 115 may concatenate its status as a slave interface such as designated by [0] to the default link ID of [0] for P2P link 145 to form a node ID of [00]. Master interface 125 in first-hop slave 110 may then concatenate its node ID of [01] to the node ID of [00] to form a first partial concatenation result of [0001]. In turn, slave interface 130 in first-hop slave 110 concatenates its node ID of [00] to the first partial concatenation result form a second partial concatenation result of [000100]. Although it is not necessary since there is only one master interface 135 in host device 105, master interface 135 may then concatenate its node ID of [01] to the second partial concatenation result to form a host-facing node ID for slave interface 120 as [00010001]. Similarly, the host-facing node ID for master interface 125 is [010001] whereas the host-facing node for slave interface 130 is [0001]. A node aggregator (not illustrated) analogous to node aggregator 202 may then assign bit-optimized addresses to slave interface 130, master interface 125, and slave interface 120. Since there are three such nodes, a two-bit-wide bit optimized address will uniquely identify these nodes in network 100.

Figure 3:
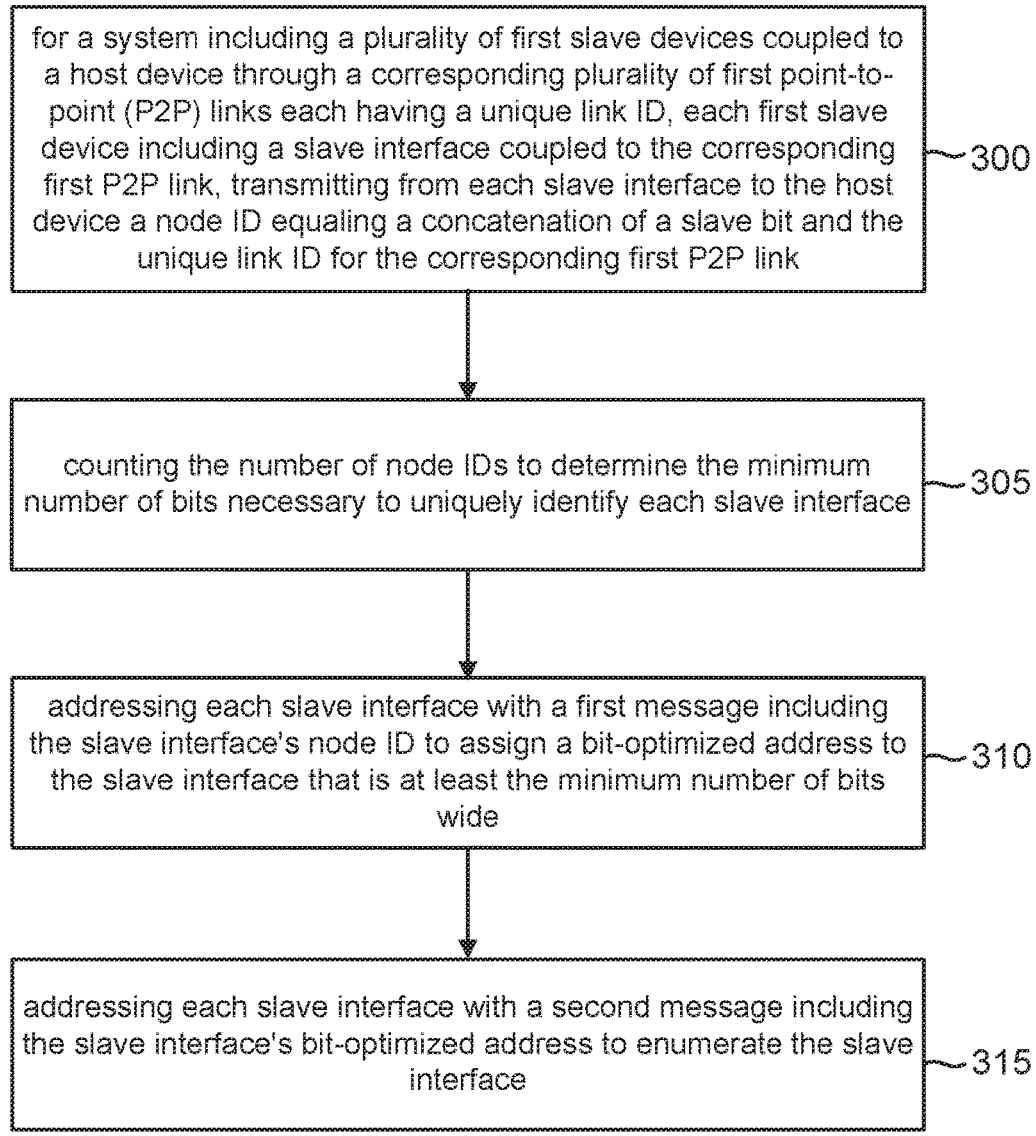
FIG. 3 is a flowchart for an example method of operation of enumerating a plurality of slave devices using bit-optimized addresses in accordance with an aspect of the disclosure.

An example method of address assignment will now be discussed with regard to the flowchart of FIG. 3. The method includes an act 300 that is performed with regard to a system including a plurality of first slave devices coupled to a host device through a corresponding plurality of first P2P links each having a unique link ID, each first slave device including a slave interface coupled to the corresponding first P2P link. Act 300 includes transmitting from each slave interface to the host device a node ID equaling a concatenation of a slave bit and the unique link ID for the corresponding first P2P link. First-hop slaves 250, 255, and 265 in system 200 are each an example of the first slave devices. After all the downstream nodes have been assigned host-facing node ID, the slave interfaces in first-hop slaves 250, 255, and 265 will send their node IDs to the corresponding master interfaces in host device 205.

The method also includes an act 305 of counting the number of node IDs to determine the minimum number of bits necessary to uniquely identify each slave interface. The counting by node aggregator 202 in host device 205 is an example of act 305. The minimum number of bits is then equal to the integer value of $\log_2(\text{count})$, where count is the number of node IDs. In alternative embodiments, the bit-optimized address may include more bits than the integer value of $\log_2(\text{count})$.

The method also includes an act 310 of addressing each slave interface with a first message including the slave interface's node ID to assign a bit-optimized address to the slave interface that is at least the minimum number of bits wide. The assignment of the bit-optimized addresses to the first-hop slave devices by node aggregator 202 of host device 205 is an example of act 310.

Finally, the method includes an act 315 of addressing each slave interface with a second message including the slave interface's bit-optimized address to enumerate the slave interface. For example, each first-hop slave device's slave interface may identify its status as a 2-wire or 3-wire virtual GPIO interface as part of the enumeration in act 310 in a virtual GPIO implementation. Other examples of enumeration include the assignment of a frame length for the VGI interface in the slave and master interfaces for the slave devices. In addition, the enumeration may assign an error correction algorithm for each VGI interface as well as a flow control technique.

Cartesian Address Assignment

The assignment of the bit-optimized address to each node may be specialized to assist the routing of messages through nodes. Such slave-to-slave communication will in general involve the user of a routing table that is stored in each slave device. A "Cartesian" address assignment for the nodes in the slave devices will now be discussed that is not bit-optimized but results in greatly simplified routing through the slave devices at the cost of a slight decrease in bit efficiency with regard to the resulting assigned addresses. By a simple address comparison, each slave device node may route a received packet from another slave device (or from the host device) such that the appropriate destination is always achieved.

As implied by the name "Cartesian," each address in a Cartesian address assignment comprises two ordered addresses (i.e., two numbers). It will be appreciated, however, that Cartesian addressing in alternative embodiments may be based on N coordinates in an N-dimensional space, N being an integer greater than 2. The following discussion will thus be directed to a 2-dimensional Cartesian addressing implementation without loss of generality. The first address in each address pair is denoted herein as the X address whereas a remaining second address in each address pair is denoted as the Y address. Each Cartesian address pair thus comprises an (X,Y) pair of addresses. The Cartesian addressing begins from some root address such as (0,0) for the host device itself. The Y address indicates the number of hops from the host device. For example, slave devices having a Y address of 1 have a direct P2P link to the host. Since these slave devices are directly coupled to the host device, they may also be denoted as "level 1" slave devices. Similarly, slave devices having a Y address of 2 are one hop removed from the slave through a connection though a level 1 slave device. Those slave devices having a Y address of two may thus be designated as "level 2" slave devices. Additional increments of the Y address corresponding to additional hops from the host device: Level 3 slave devices have a Y address of 3, level 4 slave devices have a Y address of 4, and so on.

Figure 4:
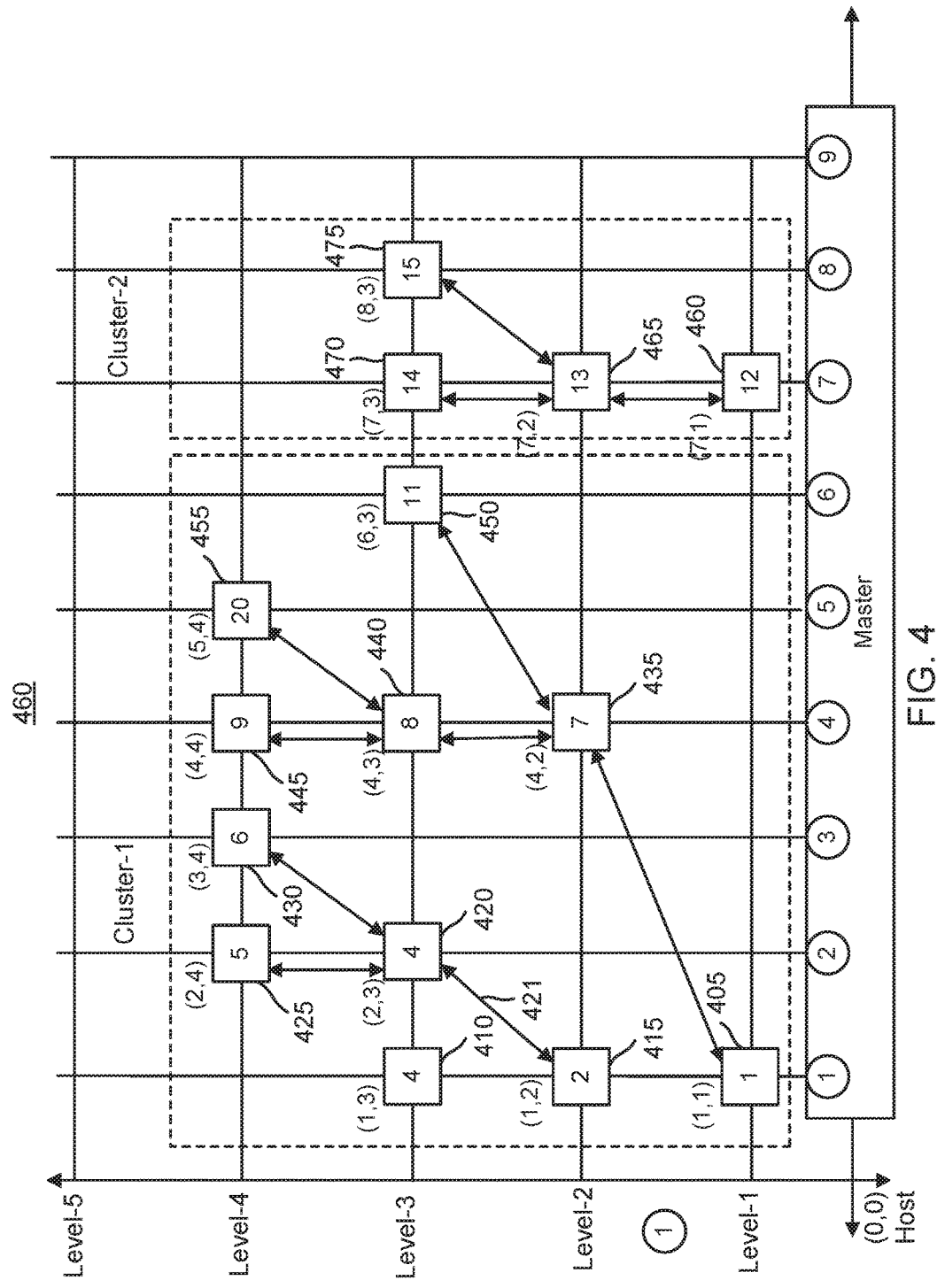
FIG. 4 illustrates an example network of slave devices and a host device in which each slave device is assigned a unique Cartesian address.

The X address relates to a slave device's position in a given cluster. As used herein, a "cluster" of slave devices are all those slave devices that indirectly couple to the host device through the same level 1 slave device. An example organization of clusters for a network 400 is shown in FIG. 4. A first cluster (Cluster-1) of slave devices are all either directly or indirectly coupled to a first level 1 slave device 405. As used herein, a slave device is said to be indirectly coupled to another device if the slave device is one or more hops removed from the other device. For example, a level 3 slave device 410 is one hop removed from level 1 slave device 405 since level 3 slave device 410 directly couples through a P2P link to a level 2 slave device 415 that in turn directly couples to level 1 slave device 405 through a corresponding P2P link.

With regard to the assignment of the X address, a first level 1 slave device such as device 405 may be given an X address of 1 (or some other starting integer). This same starting X address is then given to all slave devices directly or indirectly coupled to slave device 405 until a Y level is reached in which a slave device couples to more than one slave device in the subsequent Y level. In network 400, level 2 slave device 415 acts as a master device to level 3 slave device 410 as well as to another level 3 slave device 420. Slave device 410 may thus be given the same starting X address as used for level 2 slave device 415 but level 3 slave device 420 requires a higher X address such as the starting address plus one (in this case, 2). The Cartesian address for level 3 slave device 410 is thus (1,3) whereas it is (2,3) for level 3 slave device 420. Level 3 slave device 420 in turn acts as a master device to a first level 4 slave device 425 and to a second level 4 slave device 430. Slave device 425 may thus have a Cartesian address of (2,4) whereas slave device 430 may have a Cartesian address of (3,4). There are no further hops from slave devices 425 and 430.

Cluster 1 has another level 2 slave device 435 with a direct P2P link to level 1 slave device 405. The X address for this slave device is incremented from the highest already-existing X address in the cluster (which is 3 for level 4 slave device 430). Thus level 2 slave device 435 may be assigned an X address of 4. The Cartesian address for level 2 slave device 435 is thus (4,2). The same X address of 4 may be given to a directly-coupled level 3 slave device 440 and to a level 4 indirectly-coupled slave device 445. Level 3 slave device 440 also acts as a master to another level 4 slave device 455 so this slave device has an incremented X address from slave device 440 (namely, an X address of 5). Another level 3 slave device 450 couples to level 2 slave device 435 through a corresponding P2P link. The X address for slave device 450 is thus incremented by one with respect to the greatest already-existing X address in the cluster such that the X address for slave device 450 may equal 6 (an increment of one over the X address of 5 for slave device 455).

Once all slave devices in cluster 1 have been assigned a Cartesian address, a second cluster (cluster 2) may be addressed, starting from a level 1 slave device 460. The X address for level 1 slave device 460 is incremented from the maximum X address in the preceding cluster. Thus, the X address for slave device 460 may equal 7 (an increment of one over the maximum X address of 6 for cluster 1). Two additional slave devices 465 and 470 may also have the same X address as slave device 460 but have incremented Y addresses corresponding to their respective levels. A final slave device 475 has an incremented X address since both it and slave device 470 directly couple to slave device 465.

In contrast to the node IDs discussed with regard to FIGS. 1A and 2, a Cartesian address is the address for the corresponding slave device. The host device assigns the Cartesian addresses to the slave devices. In addition, each slave device has its host-facing port identified. This host-facing port is denoted as the slave interface in the networks of FIGS. 1A and 2. For example, a port 421 on slave device 420 is its host-facing port. In addition, the host device informs each slave device in a given cluster the minimum and maximum X dimension for its cluster. Since each slave device knows these elementary facts (its cluster's minimum and maximum X addresses as well as its host-facing port and its Cartesian address), the resulting routing becomes very robust yet simple to implement. For example, suppose that level 3 slave device 450 in cluster 1 has a message for level 4 slave device 430 that is also in cluster 1. Since there are no further hops from slave device 450, it by default will route the message through its slave facing port, which couples through the corresponding P2P link to level 3 slave device 440. The Cartesian address for level 3 slave device 430 is (3,4) whereas the X address for slave device 440 is (4,3). Since the upstream branching from any given slave never results in a decrease in the X address, slave device 440 will route the received message for Cartesian address (3,4) through it host-facing port to level 2 slave device 435. Level 2 slave device 435 will come to the same routing conclusion since its X address of 4 is greater than the X address of 3 for the (3,4) Cartesian address being routed. Thus, the message for Cartesian address (3,4) will be routed to level 1 slave device 405. So long as the X address for the routed message is greater than or equal to the X address for the routing slave device, the routing slave device will route the message upstream (to a higher level) as compared to sending the message downstream through its host-facing port. The logic for this routing may be performed in a processor such as processor 102 or a finite state machine. Each slave device may include a VGI interface for driving its host-facing port. Those slave devices that couple to high level slave devices also include another VGI interface for driving its slave-facing port.

The assignment of the Cartesian addresses may follow the order indicated in FIG. 4 by the integer written within each slave device. Level 1 slave device 405 is assigned first so it is designated by the integer 1. Once a given slave such as level 1 slave device 405 has its Cartesian address assigned, the next slave coupling through the given slave and having the same X address has its Cartesian address assigned next. Level 2 slave device 415 has the same X address but is on level 2 so it is the second slave to be assigned a Cartesian address. Similarly, level 3 slave device 410 has the same X address but is on level 3 so it is the third slave to be assigned a Cartesian address. It follows that the assignment order is thus such that level 3 slave device 420 is fourth, level 4 slave device 425 if fifth, level 4 slave device 430 is sixth, level 2 slave device 435 is seventh, level 3 slave device 440 is eighth, level 4 slave device 445 is ninth, level 4 slave device 455 is tenth, level 3 slave device 450 is eleventh, level 1 slave device 460 is twelfth, level 2 slave device 465 is thirteenth, level 3 slave device 470 is fourteenth, and level 3 slave device 475 is the fifteenth to receive a Cartesian address assignment.

A level 1 slave device can then route the received message to the host device or upstream within its cluster. This upstream or downstream decision for a level 1 slave device is determined by whether the X address is within the bounds for the corresponding cluster. With regard to cluster 1, it extends from X=1 to X=6. Thus, if level 1 slave device 405 received a message with an X coordinate of 7 or greater, it would route the message downstream to the host device so that the host device may route the message to the appropriate cluster based upon the X coordinate. In the preceding example, the X coordinate for the received message at level 1 slave device 405 is 3 such that level 1 slave device 405 routes the received message to level 2 slave device 415. Note that level 2 slave device 415 has two possible choices for its upstream routing as it can route to either level 3 slave 410 or to level 3 slave device 420. The rule is thus that the upstream routing is conducted to the slave device having the greatest X address that is less than or equal to the X address in the destination Cartesian address. Given this rule, slave device 415 would thus route the message to slave device 420. Slave device 420 also has a choice but under the routing rule would route to level 4 slave device 430. Upon receipt of a message, each slave device checks to see if the destination Cartesian address matches its own. For slave device 430, there would be a match such that the intended slave device would receive its message despite the lack of a routing table in any of the slave devices.

Figure 5:
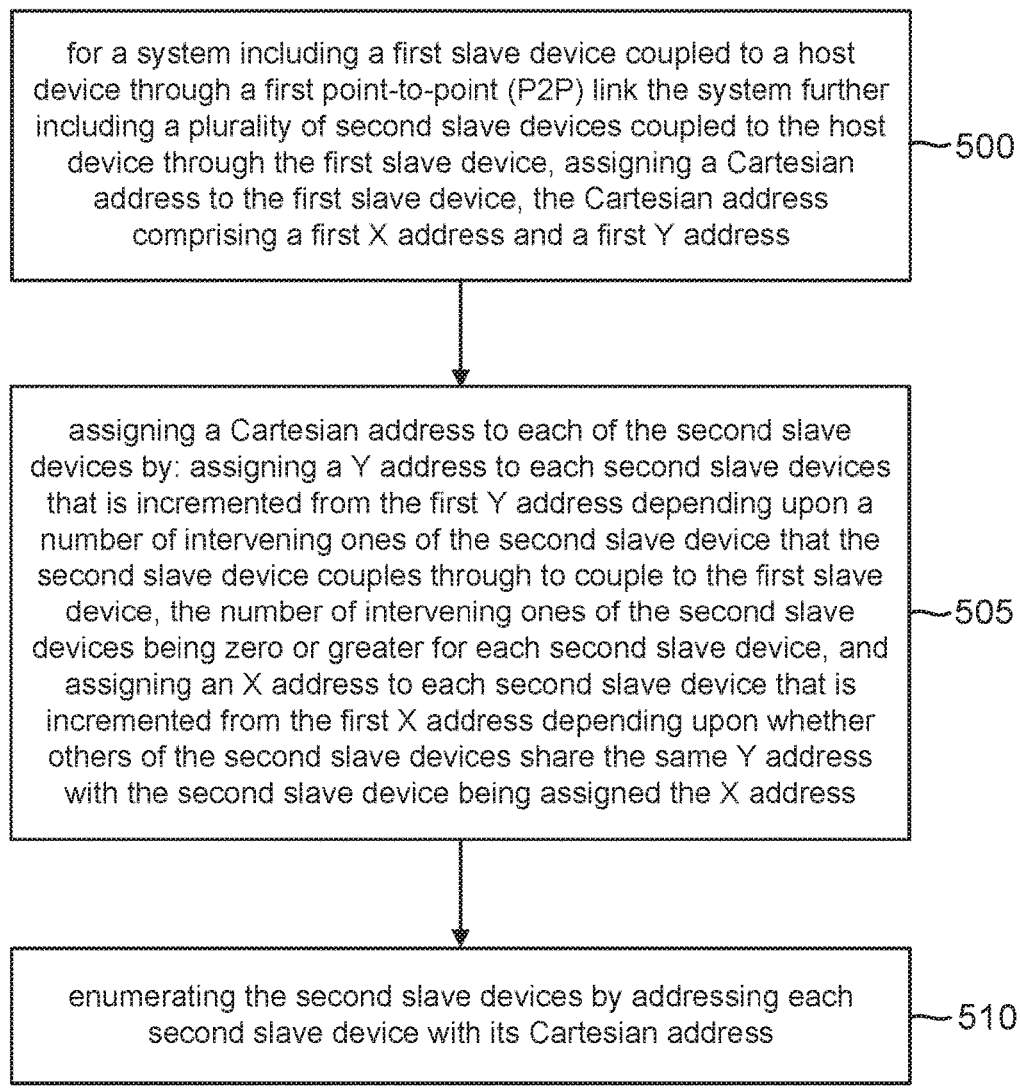
FIG. 5 is a flowchart for a method of assigning a unique Cartesian address in the network of FIG. 4 in accordance with an aspect of the disclosure.

FIG. 5 is a flowchart for an example method of assigning a unique Cartesian address for a system including a first slave device coupled to a host device through a first point-to-point (P2P) link the system further including a plurality of second slave devices coupled to the host device through the first slave device. The method includes an act 500 of assigning a Cartesian address to the first slave device, the Cartesian address comprising a first X address and a first Y address. The assignment of the Cartesian address (1,1) to first-hop slave device 405 in FIG. 4 is an example of the first slave device.

The method also includes an act 505 of assigning a Cartesian address to each of the second slave devices by: assigning a Y address to each second slave devices that is incremented from the first Y address depending upon a number of intervening ones of the second slave device that the second slave device couples through to couple to the first slave device, the number of intervening ones of the second slave devices being zero or greater for each second slave device, and assigning an X address to each second slave device that is incremented from the first X address depending upon whether others of the second slave devices share the same Y address with the second slave device being assigned the X address. The assignment of the X and Y addresses to slave devices 415, 410, 425, and 430 in FIG. 4 is an example of act 505. Note that the X address to slave devices 420 and 430 is incremented as each of these slaves is the second slave device at its level. Similarly, the Y address for a given one of these slaves is incremented from the root Y address for first-hop slave 405 depending upon how many slaves intervene between it and first-hop slave device 405. For example, slave device 430 couples to first-hop slave device 405 through slave devices 420 and 415. It is thus 3 slaves removed (counting itself) from first-hop slave device 405. The Y address for slave device 430 is thus the root Y address for first-hop slave device 405 such that the Y address for slave device 430 is 3+1=4.

Finally, the method includes an act 510 of enumerating the second slave devices by addressing each second slave device with its Cartesian address. The enumeration of the slave devices in FIG. 4 may proceed as discussed with regard to FIGS. 2 and 3 except that the bit-optimized addressing is replaced by the Cartesian addressing.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A system, comprising:
a host device including a host master interface connected to a first point-to-point (P2P) link having a first link ID, the host device further including a node aggregator comprising a processor, wherein the host device is configured to concatenate a master bit to the first link ID to form a node identification (ID) for the host master interface;
a first slave device including a first slave interface connected to the first P2P link, the first slave device further including a slave master interface connected to a second P2P link having a second link ID, wherein the first slave device is configured to concatenate a slave bit to the first link ID to form a node ID for the first slave interface and to concatenate a master bit to the second link ID to form a node ID for the slave master interface; and
a second slave device including a second slave interface connected to the second P2P link, wherein the second slave device is configured to concatenate a slave bit to the second link ID to form a node ID for the second slave interface;
wherein the node aggregator is configured to assign a host-facing address for the second slave device that is a concatenation of the node ID for the second slave interface, the node ID for the master slave interface, the node ID for the first slave interface, and the node ID for the host master interface and to assign a host-facing address for the first slave device that is a concatenation of the node ID for the first slave interface and the node ID for the host master interface, and wherein the node aggregator is further configured to address each slave device with a message including the slave device's host-facing address, the message including a bit-optimized address to be assigned to the slave device, the bit-optimized address for each slave device being shorter than the host-facing address for each slave device.

2. The system of claim 1, wherein the host master interface and the slave master interface each comprises:
a finite state machine configured to serialize a corresponding transmit set of GPIO signals into at least one first frame of virtual GPIO signals; and
a Universal Asynchronous Receiver/Transmitter (UART) interface configured to transmit the at least one first frame over a UART transmit pin responsive to cycles of an oversampling clock, wherein the processor is further configured to assign a frame length to each first slave device's slave interface by communicating with the first slave device using its bit-optimized address, and wherein each finite state machine is further configured to serialize the corresponding transmit set of GPIO signals into the at least one frame of virtual GPIO signals according to the assigned frame length.

3. The system of claim 2, wherein the finite state machine includes a plurality of messaging registers, and wherein the processor is configured to write a plurality of messaging signals to the messaging registers, and wherein the finite state machine is further configured to serialize the messaging signals from the messaging registers into at least one second frame, and wherein the UART interface is further configured to transmit the at least one second frame over the UART transmit pin responsive to cycles of the oversampling clock.

4. The system of claim 1, wherein the first slave device includes a second slave master interface coupled through an additional P2P link to a slave interface in a corresponding second slave device from a plurality of second slave devices, each additional P2P link have a link ID, and wherein the node aggregator is further configured to receive a second concatenated node ID from the slave interfaces in the second slave devices that equals a concatenation of node IDs.

5. A method, comprising:
for a host device having a host master interface connected through a first point-to-point (P2P) link to a first slave interface in a first slave device, concatenating a master bit with a link identification (ID) for the first P2P link to form a node ID for the host master interface;
concatenating a slave bit with the link ID for the first P2P link to form a node ID for the first slave interface;
for a second slave device having a second slave interface connected through a second P2P link to a first slave master interface in the first slave device, concatenating a slave bit with a link ID for the second P2P link to form a node ID for the second slave interface;

concatenating a master bit with the link ID for the second P2P link to form a node ID for the first slave master interface;

concatenating the node IDs for the second slave interface, the first slave master interface, the first slave interface, and the host master interface to form a host-facing address for the second slave device;

concatenating the node IDs for the first slave interface and the host master interface to form a host-facing address for the first slave device;

addressing the first slave device with a first message including the first slave device's host-facing address to assign a bit-optimized address to the first slave device;

addressing the second slave device with a second message including the second slave device's host-facing address to assign a bit-optimized address to the second slave device;

enumerating the first slave device using the first slave device's bit-optimized address; and enumerating the second slave device using the second slave device's bit-optimized address.

6. The method of claim 5, further comprising:

for a third slave device having a third slave interface connected through a third P2P link to a second slave master interface in the first slave device, receiving at the host device a host-facing address from the third slave interface in the third slave device that equals a concatenation of a node ID for the third slave interface in the third slave device, a node ID for the second slave master interface, and the node ID for the first slave interface.

7. The method of claim 6, further comprising: from the host device, addressing the third slave interface in the third slave device with a message including the host-facing address for the third slave device to assign a bit-optimized address to the third slave device.

8. The method of claim 5, wherein enumerating each slave interface comprises assigning a virtual general purpose input output (GPIO) frame length for each slave interface.

9. The method of claim 5, wherein enumerating each slave device comprises assigning a flow control technique to each slave device.

10. The method of claim 5, wherein enumerating each slave device comprises assigning an error correction technique to each slave device.

11. The method of claim 5, wherein each bit-optimized address is a power of 2 bits wide.

* * * * *

UNITED STATES PATENT AND TRADEMARK OFFICE
CERTIFICATE OF CORRECTION

PATENT NO. : 9,979,782 B2  
APPLICATION NO. : 15/077841  
DATED : May 22, 2018  
INVENTOR(S) : Lalan Jee Mishra, James Panian and Richard Wietfeldt Page 1 of 1

It is certified that error appears in the above-identified patent and that said Letters Patent is hereby corrected as shown below:

In the Specification

In the Detailed Description:
In Column 2, delete Lines 64 to 67

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*